Dec. 4, 1956 R. G. CLAPP ET AL 2,773,117

CATHODE RAY TUBE BEAM INTENSITY CONTROL

Filed Feb. 23, 1954

INVENTORS
RICHARD G. CLAPP
LINCOLN W. HERSHINGER
BY
Allen V. Hazeltine
ATTORNEY.

United States Patent Office 2,773,117

Patented Dec. 4, 1956

2,773,117

CATHODE RAY TUBE BEAM INTENSITY CONTROL

Richard G. Clapp, Narberth, and Lincoln W. Hershinger, Oreland, Pa., assignors to Philco Corporation, Philadelphia, Pa., a corporation of Pennsylvania Application February 23, 1954, Serial No. 411,758

15 Claims. (Cl. 178—5.4)

The present invention relates to electrical systems and more particularly to cathode ray tube systems comprising a beam intercepting structure and an indexing member arranged in cooperative relationship with the beam intercepting structure and adapted to produce a signal whose time of occurrence is indicative of the position of the cathode ray beam on the beam intercepting structure.

The invention is particularly adapted for and will be described in connection with a color television image presentation system utilizing a single cathode ray tube having a beam intercepting, image forming screen member comprising vertical stripes of luminescent materials. These stripes are preferably arranged in laterally displaced color triplets, each triplet comprising three vertical phosphor stripes which respond to electron impingement, to produce light of the different primary colors. The order of arrangement of the stripes may be such that the normal horizontally scanning cathode ray beam produces red, green and blue light successively. From a color television receiver there may then be supplied three separate video signals, each indicative of a different primary color component of a televised scene, which signals are sequentially utilized to control the intensity of the cathode ray beam. For proper color rendition it is required that, as the phosphor stripes producing each of the primary colors of light are impinged by the cathode ray beam, the intensity of the beam be simultaneously controlled in response to the contemporaneous value of the video signal representing the corresponding color component of the televised scene. However, since the rate at which the beam scans across the phosphor stripes of the screen may vary, due to non-linearity of the beam deflecting signal or due to a non-uniform distribution of the phosphor stripes on the screen surface, a phase synchronous relationship between the signal applied to the intensity control system of the cathode ray beam and the scanning of the beam must be continuously reestablished. Such a synchronous relationship may be maintained throughout the scanning cycle by deriving, from the beam intercepting structure, indexing signals indicative of the instantaneous position of the cathode ray beam upon the image forming screen, and by utilizing these indexing signals to control the relationship between the phase of the signal applied to the beam intensity controlling system and the position of the beam. The indexing signals may be derived from a plurality of striped members arranged on the beam intercepting screen structure, each in register with a color triplet. For example, the indexing stripes may be superimposed on a given one of the phosphor stripes of the color triplet or may be aranged adjacent to each color triplet in the spacing between consecutive triplets. When the beam scans the screen, the indexing stripes are excited in spaced time sequence to the scanning of the color triplets and a series of pulses is generated in a suitable output electrode system of the cathode ray tube system.

The indexing stripes may comprise a material having secondary-emissive properties which differ from the secondary-emissive properties of the remaining portions of the beam intercepting structure. For example the indexing stripes may consist of a high atomic number material, such as gold, platinum or tungsten, or may consist of certain oxides such as cesium oxide or magnesium oxide, and the remainder of the beam intercepting structure may be provided with a coating of a material having a detectably different secondary emissive ratio such as aluminum, which coating also serves as a light reflecting mirror for the phosphor stripes in accordance with well known practice. With such an arrangement the indexing signals may be derived from the collector electrode arranged in the vicinity of the screen structure. Alternatively the indexing stripes may consist of a fluorescent material, and the indexing signals may be derived from a suitable photoelectric cell arranged at a sidewall portion of the cathode ray tube out of the path of the cathode ray beam and facing the beam intercepting surface of the screen structure. Such a phosphor material may consist, for example, of cesium activated zinc oxide having a spectral output in the non-visible light region, or may consist of a phosphor having its spectral output in the visible light region, in which case suitable light baffling means may be interposed between the fluorescent image producing stripes and the indexing stripes to prevent mutual contamination of the respective responses.

Under certain conditions, the cathode ray beam may be extinguished at the instant that it would normally impinge on the indexing stripes. More particularly, when the transmitted image contains a black area, the beam is normally extinguished during the scanning of the corresponding area of the reproduced image at the receiver. Furthermore, when the indexing stripes are positioned on a phosphor stripe of a particular color, e. g. the green phosphor stripe, and when this particular primary color is absent from the color value of the image or image portion to be reproduced, the beam is normally extinguished at the instants that it scans these particular phosphor stripes and the superimposed indexing stripes. Thus, in either of the above instances, the indexing stripes will not be excited by the beam and the indexing signal will not be generated.

It has been proposed to avoid this difficulty by operating the cathode ray beam so that its intensity is at least equal to a predetermined fixed finite value, thereby producing an indexing signal of at least a minimum intensity value irrespective of the nature of the color image being reproduced. While this expedient produces desaturation of the image colors, it has been found that the desaturation brought about can be held to an unobjectionable value and that an indexing signal of sufficient intensity can be obtained when the minimum beam current is selected to be a value of the order of a few percent of its average intensity value, e. g. of the order of 7% of its average value. In practice this minimum value of beam current is selected to be of the order of 20 microamperes. It will be appreciated that when the beam current has such a small value, relatively small changes in the operating characteristics of the cathode ray tube, brought about for example by aging effects or changes in the supply voltages thereof, are sufficient to cause relatively large percentage changes in beam current value so that, on the one hand, the beam intensity may diminish to a value insufficient to adequately excite the indexing stripes or, on the other hand, may increase to a value sufficient to bring about objectionable desaturation of the image colors.

Another important problem introduced when the cathode ray tube is operated so that its beam current is always maintained at a finite value, is that of avoiding undesired phase variations of the generated indexing signal with changes in the color information supplied to the image tube and brought about by the following. Consider, for example, an image screen made up of red, green and blue phosphor stripes arranged to be scanned in sequence and having an indexing stripe arranged over the green stripe. In order to produce a red image field, the applied red video signal component is ideally in the form of bursts which recur in synchronism with the scanning of the red stripes and have zero amplitude value at the instant that the beam impinges the green stripe and its superimposed index stripe. As a practical matter, due to the limited bandwidth of the video channel, the red video signal component will be sinusoidal in form and has a half-period duration greater than the width of the red phosphor stripe. When the cathode ray tube is operated under beam cut-off conditions, the effective duration of this red sinusoidal component may be reduced to a value as determined by the width of the red phosphor stripe by appropriately selecting the cut-off bias voltage applied to the beam intensity control electrode of the cathode ray tube. However, this expedient is not available when the tube is to be operated under conditions producing a steady state minimum beam current. As a consequence, the red signal is not reduced to zero value when the beam impinges the indexing stripe arranged on the adjacently positioned green phosphor stripes, and a false indexing signal is produced. This false signal cannot be discriminated against by the processing circuits for the indexing signal and causes a phase shift of the desired indexing information in the direction of the red stripes by an amount determined by the intensity of the red video signal.

Similar effects obtain when reproducing a blue image field, in which case the false indexing signal causes a phase shift of the indexing information in the direction of the blue stripes by an amount determined by the intensity of the blue video signal.

It is an object of the invention to provide an improved cathode ray tube system for producing a color television image.

Another object of the invention is to provide improved cathode ray tube systems of the type in which the position of an electron beam on a beam intercepting screen structure is indicated by an indexing signal derived from indexing members cooperatively associated with the screen structure.

A further object of the invention is to provide a color television cathode ray tube system in which the position of an electron beam is indicated by an indexing signal and in which the minimum intensity of the beam is established at a finite value and maintained at the selected value with great precision and stability.

Still another object of the invention is to provide a color television cathode ray tube system of the foregoing type in which undesired phase variations of the generated indexing signal are obviated.

These and further objects of the invention will appear as the specification progresses.

In accordance with the invention, in a cathode ray tube system comprising a beam intercepting member including indexing regions adapted to produce an indexing signal indicative of the position of the beam and in which the intensity of the beam is established at a finite minimum value, the foregoing objects are achieved by embodying a degenerative feedback network within the beam current and signal path of the tube. It is a feature of the invention that the said degenerative feedback network has a preestablished limited range of operation so that the network is effective when image signals of a first range of voltage are applied to the image tube and is relatively ineffective when signals of a second range of voltage are applied to the image tube. In a preferred form of the invention, hereinafter to be specifically described, the degenerative feedback network comprises an impedance element connected in the cathode circuit of the cathode ray tube and further comprises a diode element which is connected in shunt with the impedance element and has a preestablished conduction threshold so that the cathode impedance element is effectively shorted out when the video signal supplied to the cathode ray tube exceeds a predetermined voltage.

The invention will be described in greater detail with reference to the appended drawings forming part of the specification and in which.

Figure 1:
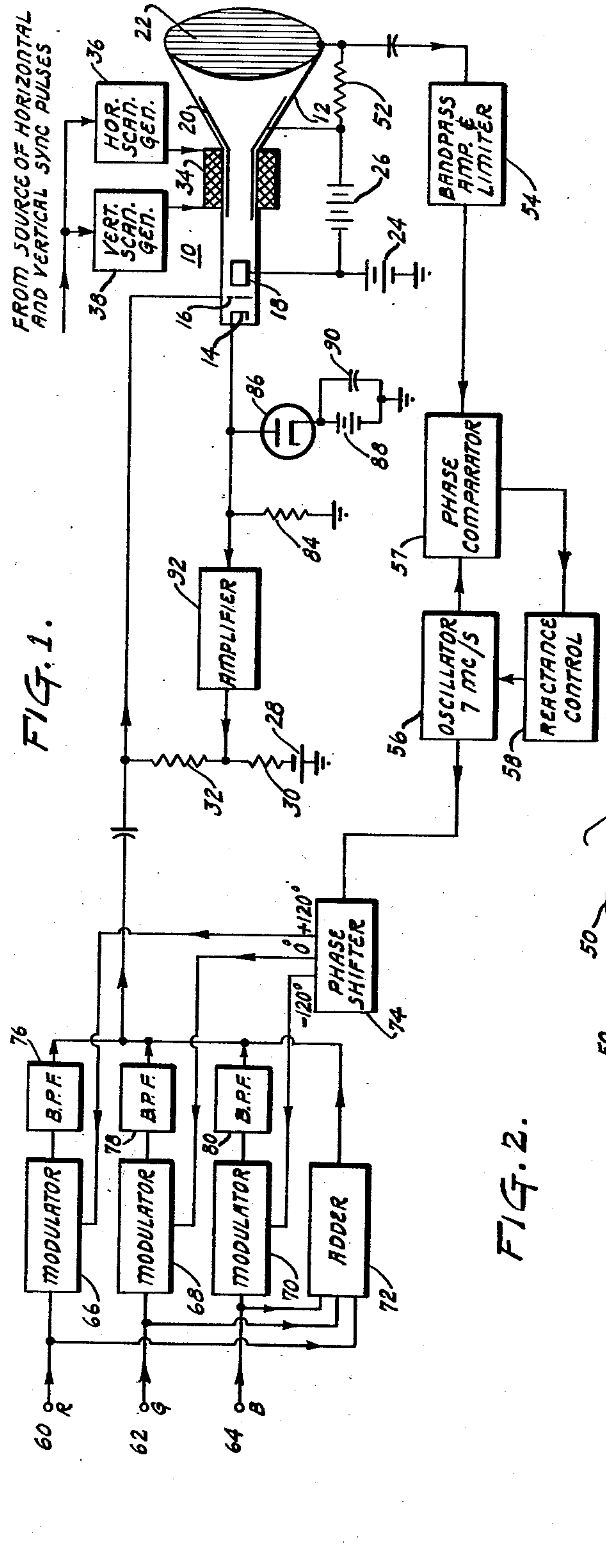
Figure 1 is a block diagram, partly schematic, showing one form of a cathode ray tube system in accordance with the invention.

Referring to Figure 1, the cathode ray tube system there shown comprises a cathode ray tube 10 containing, within an evacuated envelope 12, a beam generating and intensity control system comprising a cathode 14, a control grid 16, a focusing anode 18 and an accelerating anode 20, the latter of which may consist of a conductive coating on the inner wall of the envelope which terminates at a point spaced from the end face 22 of the tube in conformity with well established practice. Electrodes 18 and 20 are maintained at their desired operating potentials by suitable voltage sources shown as batteries 24 and 26, the battery 24 having its positive pole connected to the anode 18 and its negative pole connected to a point at ground potential, and the battery 26 being connected with its positive pole to electrode 20 and its negative pole to the positive pole of battery 24. In practice the battery 24 has a potential of the order of 1 to 3 kilovolts, whereas the battery 26 has a potential of the order of 10 to 20 kilovolts. As fully described hereinafter, the cathode ray tube is operated so that its beam current always exceeds a predetermined minimum value, and to this end a biasing potential, derived from a suitable source shown as a battery 28, is applied to the control grid 16 through two series connected resistors 30 and 32.

A deflection yoke 34 coupled to horizontal and vertical deflection signal generators 36 and 38 respectively, of conventional design, is provided for deflecting the beam across the face plate 22 of the tube to form a raster thereon.

Figure 2:
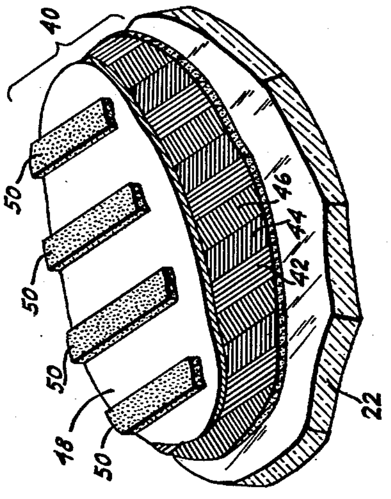
Figure 2 is a perspective view of a portion of one form of an image reproducing screen structure suitable for the cathode ray tube systems of the invention.

The end face 22 of the tube 10 is provided with a beam intercepting structure 40, one suitable form of which is shown in Figure 2. In the arrangement shown in Figure 2 the structure 40 is formed directly on the face plate 22; however, it should be well understood that the structure 40 may be formed on a suitable light transparent base which is independent of the face plate 22 and may be spaced therefrom. In the arrangement shown, the end face 22, which in practice consists of glass having preferably substantially uniform transmission characteristics for the various colors in the visible spectrum, is provided with a plurality of elongated parallelly arranged stripes 42, 44 and 46, of phosphor material which, upon impingement of the cathode beam, fluoresce to produce light of three different primary colors. For example, the stripes 42 may consist of a phosphor such as zinc phosphate containing manganese as an activator, which upon electron impingement produces red light; the stripes 44 may consist of a phosphor such as zinc orthosilicate, which produces green light; and the stripes 46 may consist of a phosphor such as calcium magnesium silicate containing titanium as an activator, which produces blue light. Other suitable materials which may be used to form the phosphor stripes 42, 44 and 46 are well known to those skilled in the art, as well as methods of applying the same to the face plate 22, and further details herein concerning the same are believed to be unnecessary. Each of the groups of stripes may be termed a color triplet and, as will be noted, the sequence of the stripes is repeated in consecutive order over the area of the structure 40.

In the arrangement shown, the indexing signal is produced by means of indexing stripes of a given secondary-electron-emissivity differing from the secondary-electron-emissivity of the remainder of the beam intercepting structure. For this purpose the structure 40 further comprises a thin, electron permeable, electrically conductive layer 48 of low electron-emissivity. The layer 48 is arranged on the phosphor stripes 42, 44 and 46 and preferably further constitutes a mirror for reflecting light generated at the phosphor stripes. In practice the layer 48 is a light reflecting aluminum coating which is formed in well known manner. It should be well understood that other metals capable of forming a coating in the manner similar to aluminum, and having a secondary-electron-emissivity detectably different from that of the material of the indexing members, may also be used. Such other metals may be, for example, magnesium or beryllium.

Arranged on the coating 48, and positioned over the green phosphor stripes 44, are indexing stripes 50 consisting of a material having a secondary-electron emissivity detectably different from that of the material of coating 48. The stripes 50 may consist of magnesium oxide, or of a high atomic number metal such as gold, platinum or tungsten.

The beam intercepting structure so constituted is connected to the positive pole of the battery 26 through a load impedance 52 by means of a suitable lead attached to the aluminum coating 48.

The scanning of the cathode ray beam over the surface of the image screen causes the beam to impinge successively the consecutive indexing stripes 50 and thereby produce across the load impedance 52 a succession of indexing signal pulses the time phase position of which is indicative of the position of the beam on the screen surface. In a typical case in which the beam impinges consecutive indexing stripes at a rate of 7 million per second as determined by the number of indexing stripes, and hence the number of groups of phosphor stripes, and by the nominal scanning velocity of the beam, the frequency of the consecutive pulses generated will be nominally 7 mc./sec. and will undergo frequency variations about the nominal value as determined by variations of the rate at which the consecutive indexing stripes are impinged. This indexing signal, after being suitably amplified by an amplifier 54, may be used in any of several manners for controlling the relationship between the time phase position of the video information supplied to the beam intensity control electrode 16 and the position of the beam. In the arrangement shown in Figure 1 the indexing signal serves to control the phase and frequency of the signal from an oscillator 56, which latter signal, in turn, is used to control the time sequence in which three separate video signals, each indicative of a different primary color component of the televised scene, are applied to the control electrode 16. The control of the oscillator 56 is brought about by means of a control system comprising a phase comparator 57, to the inputs of which the indexing signal from amplifier 54 and a signal from oscillator 56 are applied, and a reactance control 58 which is energized by the phase comparator 57 and which is adapted to vary the frequency and phase of the signal produced by oscillator 56.

Amplifier 54 may be of conventional form and is characterized by having sufficient gain to amplify the indexing signal derived from the image screen of tube 10 to a conveniently usable level, and may be adapted to do so without distortion of the indexing signal wave form, although this is not essential so long as the phase characteristics of the amplifier are such that the peaks of the amplified output signals therefrom occur in predetermined time relationship to the times of the peaks of the input signal from the load impedance 52. The amplifier may further contain an amplitude limiter of conventional design—i. e. a diode clipper—by means of which a substantially constant-amplitude output signal is produced.

In a typical form the oscillator 56 may comprise an electron discharge device having its input and output electrodes coupled together in regenerative feedback relationship by means of a resonant circuit tuned to the nominal frequency of the oscillator, i. e. tuned to 7 mc./sec.

The phase comparator 57 may be conventional in form and may consist for example of a bridge, two arms of which are made up of diode elements which are energized in phase opposition by one of the input signals and energized in the same phase sense by the other of the input signals. In one form the phase comparator may be of the type described by R. H. Dishington in the publication "Proceedings of the I. R. E.," December 1949, at page 1401 et seq. The output signal of the phase comparator 57 has a polarity and amplitude as determined by the instantaneous difference between the frequency of the oscillator 56 and the output signal of amplifier 57, and this output signal serves as a control quantity to actuate the reactance control 58 which in turn adjusts the frequency of oscillator 56 to exact synchronism with the indexing signal derived from amplifier 54.

The reactance control 58 may take any of well known forms and may consist, for example, of a Miller type reactance tube shunting the tuned circuit of oscillator 56 and adapted to vary the resonant frequency thereof as determined by the amplitude of the control signal applied to the input electrode of the reactance tube and derived from the phase comparator 58.

For reproducing a color image on the face plate of the cathode ray tube there are provided color signal input terminals 60, 62 and 64 which are supplied from a television receiver (not shown) with separate signals indicative of the red, green and blue components of the televised scene, respectively. The system then operates to effectively convert these three color signals into a wave having the color information arranged in time reference sequence so that the red information occurs when the cathode ray beam impinges the red stripes 42 of the beam intercepting structure 40, the green information occurs upon impingement of the green stripes 44, and the blue information occurs when the blue stripes 46 are impinged.

The conversion of the color signals into a wave having the color information arranged in time reference sequence may be achieved by means of a modulation system suitably energized by the respective color signals and by appropriately phase related modulating signals. In the arrangement shown, the desired conversion is effected by modulators 66, 68 and 70 the outputs of which are coupled in common and supply the control grid 16 of the tube 10. Modulators 66, 68 and 70 may be of conventional form and may each consist, for example, of a dual grid thermionic tube, to one grid of which is applied the color signal from the respective terminals 60, 62 and 64 and to the other grid of which is applied an individual modulating signal. The modulating signals may be derived from a phase shifter 74 which is energized by the oscillator 56 and is adapted to produce, by means of suitable phase shifting networks, three modulation voltages appropriately phase displaced. In the arrangement specifically described, wherein the phosphor stripes 42, 44 and 46 (see Figure 2) are uniformly distributed throughout the width of each color triplet, the modulation voltages from the phase shifter 74 bear a 120° phase relationship as shown.

As previously pointed out, in order to insure the occurence of an indexing signal when the image to be reproduced contains large areas of no color (black) or contains large areas substantially free from the particular primary color generated by the phosphor stripes on which the indexing stripes 50 are positioned, the potential of the control grid 16 of the tube 10 is adjusted, by means of the source 28, so that, in the absence of a video signal, the beam current has a predetermined small value. This value of the beam current, which in practice is of the order of 20 microamperes, should be stably maintained at the assigned value in order to avoid the possibility of producing an indexing signal of insufficient intensity or the possibility of causing undesirable desaturation of the image colors.

In the system shown in Figure 1, the beam current is stably maintained at the desired value by means of a resistor 84 which is connected in the cathode circuit of the tube 10 and which, by reason of the degenerative feedback action produced by the cathode current passing therethrough, varies the potential between the cathode 14 and the control grid 16 in a sense to compensate any changes in the established value of the beam current due to changes in the operating characteristics of the tube 10. Since the resistor 84 is also contained in the signal circuit of the video signal supplied to the control grid 16, it also serves to degenerate the video signal. However, in accordance with the invention the degenerative feedback action produced by the resistor 84 is selectively controlled so that it is fully effective when the video signal supplied to the control grid 16 has a range of voltage less than a preestablished value, and is diminished and preferably reduced substantially to zero when the video signal has a range of voltage greater than the preestablished value. For this purpose, the degenerative feedback path is shunted by a diode element 86 having its anode connected to the positive potential end of resistor 84, i. e. connected to the cathode 14, and having its cathode connected to a point at ground potential through a biasing voltage source 88 shown as a battery connected with its positive pole to the cathode of the diode 86. To insure a low impedance connection between the cathode of the diode 86 and the point at ground potential, the source 88 may be shunted by a by-pass condenser 90 as shown.

Figure 3:
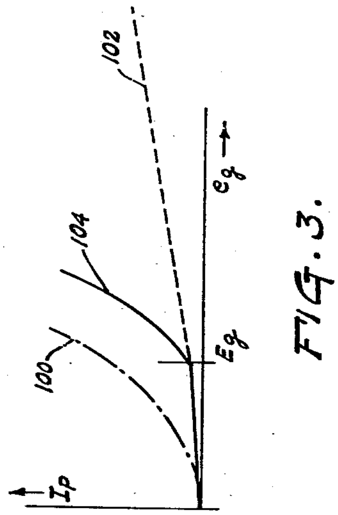
Figure 3 is a graph illustrating the beam-current versus control-voltage characteristic of a cathode ray tube system in accordance with the invention.

The beam-current versus control-voltage characteristic imparted to the tube 10 by the selective degenerative feedback system above described is shown in Figure 3. In Figure 3, the normal characteristic of the tube without degenerative feedback is represented by the dash-dot curve 100, the normal characteristic with degenerative feedback is represented by the curve 102 and the characteristic with the selective degenerative feedback in accordance with the invention is represented by the curve 104. As will be noted, the curves 102 and 104 coincide for all values of the potential applied to the control grid 16 less than the value $E_g$ so that, whenever the video signal applied to the control grid has a voltage less than the value $E_g$, the applied signal is degenerated. However, when the signal applied to the control grid has a voltage greater than the value $E_g$, e. g. has a voltage more positive than the voltage $E_g$, the tube characteristic has a shape similar to that of the normal characteristic 100 so that, at such greater voltage values, no degeneration of the video signal occurs. The transition point $E_g$ is established by the biasing potential provided by the source 88.

It will be noted that, in addition to degenerating the D.-C. component of the beam current as determined by the bias source 28, and thereby stabilizing the minimum established value of the beam current, the degenerative feedback system selectively degenerates those portions of the color video signal components having an amplitude less than the value $E_g$. Accordingly, notwithstanding the fact that the individual color video signal components may have a duration greater than the time of scanning the phosphor stripes, they do not cause the indexing stripes to be energized to a significant degree because the effective duration of the pulses is shortened by the degenerative feedback action which reduces the amplitude of the leading and lagging portions of the color signal components. In addition, any negative voltage excursion of the applied video signal, normally tending to produce beam current cut-off in the tube, is reduced by the degenerative feedback action so that a possible loss of indexing information from this source is obviated.

The extent to which the video signal components are effectively shortened is controlled by the value of the voltage $E_g$ whereby the more positive the value of the voltage $E_g$, the greater will be the contraction of the effective duration of the video signal components. On the other hand, when $E_g$ has a value equal to the voltage produced by the flow of the minimum established beam current through the resistor 84, there is substantially no contraction of the effective duration of the video signal components.

The amount of degenerative feedback action produced, and hence the improvement in the stability of the established value of the minimum beam current and the degree to which the video signal is attenuated for voltage values thereof less than the value $E_g$, is determined by the value of the resistor 84, whereby the greater the value of this resistor, the greater is the improvement brought about. In practice the cathode resistor 84 may have a value of the order of one-quarter megohm. In some instances it is found that the stray capacity normally existing between the cathode 14 of the tube 10 and ground may be sufficiently large so that the net impedance in the cathode circuit is reduced to a relatively small value with respect to the value of the resistor 84 and the desired degenerative feedback action is seriously impaired.

This difficulty is avoided, in accordance with a further feature of the invention which makes it possible to provide the desired degenerative feedback action, by the use of a cathode resistor 84 having a relatively small value so that the undesirable effects of the stray capacitance are obviated. More particularly, there is provided an amplifier 92, which has its input circuit connected to the high potential end of resistor 84 and its output circuit connected to the junction of resistors 30 and 32, and by means of which the voltage generated across resistor 84 is appropriately amplified and supplied to the control grid 16 in a degenerating sense. Amplifier 92 may be conventional in form and is adapted to amplify both the D. C. component and the color video component of the signal generated across resistor 84—i. e., the amplifier 92 has a bandwidth of the order of 28 mc./sec.

The gain of the amplifier is determined by the amount of degeneration to be produced in the system and the available input signal produced by the resistor 84. In a typical case, in which the effective transconductance of the cathode ray tube is 20$\mu$ mhos and the impedance in the cathode circuit is of the order of 280 ohms, an amplifier gain of approximately 900 is sufficient to produce the desired stabilization of the beam current and attenuation of the low level components of the video signal. A suitable form of amplifier for this purpose is described, for example, in the publication "Proceedings of the I. R. E." August 1948, at page 956 et seq.

While the invention has been described with reference to an amplitude responsive degenerative feedback network consisting of a resistor arranged in the cathode circuit of the cathode ray tube and a biased diode shunting the said cathode resistor, it will be evident that other forms of amplitude responsive degenerative feedback networks may also be used. For example, when the cathode ray tube contains a beam accelerating electrode which intercepts a portion of the beam, e. g., an accelerating electrode having a beam defining aperture, the desired degenerative feedback signal may be produced by means of a resistor arranged in the D. C. path supplying this electrode so as to produce a signal, the amplitude of which is determined by the intensity of the beam. In accordance with the principles set forth above, a biased diode element may be connected across the said resistor and serves to shunt the resistor and thereby diminish the generated voltage when the beam current, as determined by the applied color video signal, exceeds a preestablished value. The so generated signal is then applied in negative feedback relationship to the beam intensity control electrode to thereby stabilize the established minimum value of the beam current. In such an arrangement, the potential applied to the accelerating electrode may be prevented from influencing the potential at the beam intensity control electrode by means of an appropriate compensating system—for example, by the provision of a source of compensating voltage of appropriate value in the feedback path.

While we have described our invention by means of specific examples and in specific embodiments, we do not wish to be limited thereto for obvious modifications will occur to those skilled in the art without departing from the spirit and scope of the invention.

What we claim is:

1. A cathode ray tube system comprising a cathode ray tube having means for generating an electron beam, means including a control electrode for varying the intensity of said beam and a beam intercepting member, means for producing a signal having variations determined by the intensity variations of said beam, means coupled to said signal producing means for limiting the amplitude of said signal when said beam intensity exceeds a given value, and means for applying said signal to said beam intensity control means in a sense to oppose variations in the intensity of said beam when the intensity value thereof is less than said given value.

2. A cathode ray tube system as claimed in claim 1 wherein said beam intercepting member comprises portions adapted to produce a given response upon electron impingement, and further comprising a source of a second signal having variations indicative of desired variations of the response of said portions, and means for applying said second signal to said beam intensity control means.

3. A cathode ray tube system as claimed in claim 1 wherein said beam intercepting member comprises portions adapted to produce a given response upon electron impingement, and further comprising a source of a second signal having variations indicative of desired variations of the response of said portions and having peak amplitude values sufficient to vary the intensity of said beam to values greater than said given value, and means for applying said second signal to said beam intensity control means.

4. A cathode ray tube system as claimed in claim 1 wherein said means for applying said signal to said beam intensity control means comprises an amplifying system having an input circuit connected to said signal producing means and having an output circuit connected to said beam intensity control means.

5. A cathode ray tube system as claimed in claim 1 wherein said cathode ray tube comprises a cathode electrode and another electrode, and wherein said signal producing means comprises an impedance element connected to one of said last mentioned electrodes.

6. A cathode ray tube system as claimed in claim 5 wherein said signal producing means comprises a resistor element connected to said cathode electrode, and wherein said means for applying said signal to said beam intensity control means in a sense to oppose variations in the intensity of said beam comprises said resistor element 7. A cathode ray tube system as claimed in claim 5 wherein said means for limiting the amplitude of said signal comprises a unidirectionally electrically conductive element, means for applying a biasing potential to said element thereby establishing a threshold conduction level for said element, and means for connecting said biased element in shunt with said impedance.

8. A cathode ray tube system comprising a cathode ray tube having means for generating an electron beam, means including a control electrode for varying the intensity of said beam and a beam intercepting member, said beam intercepting member having first portions thereof arranged in a given geometric configuration and having a first given response characteristic upon electron impingement, said beam intercepting member further having second portions thereof arranged in a second geometric configuration indicative of said first configuration and having a second given response characteristic upon electron impingement detectably different from said first characteristic, means for scanning said beam across said beam intercepting member thereby to energize said first and second portions, means for applying to said beam intensity control means a first signal quantity having variations indicative of desired variations of the response of said first portions, means coupled to said beam intensity control means for establishing a beam current flow of a given finite minimum value, means for producing a second signal quantity having variations determined by intensity variations of said beam, means coupled to said second signal quantity producing means for limiting the amplitude of said second signal quantity when said beam intensity exceeds a second given value greater than said first value, and means for applying said second signal quantity to said beam intensity control means in a sense to oppose variations in the intensity of said beam.

9. A cathode ray tube system as claimed in claim 8 further comprising means coupled to said beam intercepting member for producing a third signal quantity having variations as determined by the energization of said second portions by said beam, and means responsive to said third signal quantity for controlling the relationship between the phase of said first signal quantity and the position of said beam on said beam intercepting member.

10. A cathode ray tube system as claimed in claim 8 wherein said cathode ray tube comprises a cathode electrode and a beam intensity control electrode, wherein said second signal quantity producing means comprises a resistor element connected to said cathode electrode, wherein said means for limiting the amplitude of said second signal quantity comprises a diode element, means for applying a biasing potential to said diode element thereby establishing a threshold conduction level for said diode element and means for connecting said biased diode element in shunt with said impedance, and wherein said means for applying said second signal quantity to said beam intensity control means comprises means for applying said signal to said beam intensity control electrode.

11. A cathode ray tube system as claimed in claim 10 wherein said means for applying said signal to said beam intensity control electrode comprises an amplifier system having an input circuit connected to said resistor and having an output circuit connected to said control electrode.

12. A cathode ray tube system for producing a color television image, comprising a cathode ray tube having means for generating an electron beam, means including a control electrode for varying the intensity of said beam and a beam intercepting member, said beam intercepting member comprising consecutively arranged first portions each comprising a plurality of stripes of fluorescent material, said stripes being adapted to produce light of different colors in response to electron impingement, said beam intercepting structure further comprising second portions spaced apart and arranged substantially parallel to said first stripes in a geometric configuration indicative of the position of said phosphor stripes and comprising a material having a given response upon electron impingement detectably different from the response of said first portions, means for scanning said beam across said beam intercepting member thereby to energize said first and second portions, means for applying to said beam intensity control means a first signal quantity having variations indicative at consecutive time intervals of desired variations of the response of said consecutively arranged phosphor stripes, means coupled to said beam intensity control means for establishing a beam current flow of a given finite minimum value, means for producing a second signal quantity having variations determined by intensity variations of said beam, means coupled to said second signal quantity producing means for limiting the amplitude of said second signal quantity when said beam intensity exceeds a second given value greater than said first value, and means for applying said second signal quantity to said beam intensity control means in a sense to oppose variations in the intensity of said beam.

13. A cathode ray tube system as claimed in claim 12 further comprising means coupled to said beam intercepting member for producing a third signal quantity having variations as determined by the energization of said second portions by said beam, and means responsive to said third signal quantity for controlling the relationship between the time of occurrence of said variations of said first signal quantity and the position of said beam on said beam intercepting member.

14. A cathode ray tube system as claimed in claim 12 wherein said cathode ray tube comprises a cathode electrode and a beam intensity control electrode, wherein said means for producing said second signal quantity comprises a resistor element connected to said cathode electrode, wherein said amplitude limiting means comprises a diode element, means for applying a biasing potential to said element thereby establishing a threshold conduction level for said element and means for connecting said biased diode element in shunt with said resistor, and wherein said cathode ray tube system comprises means for applying said second signal quantity to said control electrode in a sense maintaining the intensity of said beam substantially constant at said first given value.

15. A cathode ray tube system as claimed in claim 14 wherein said means for producing said first signal quantity comprises input means for three signals each indicative of a different color component of said image, means for combining said three signals to produce a wave having recurrent portions arranged in a sequence conforming to the scanning sequence of said phosphor stripes by said beam, means coupled to said beam intercepting member for producing a third signal quantity having variations as determined by the energization of said second portions of said beam intercepting member by said beam, and means responsive to said third signal quantity for controlling the relationship between the time of occurrence of said recurrent portions of said wave and the position of said beam on said beam intercepting member.

References Cited in the file of this patent

UNITED STATES PATENTS 2,673,890 Moulton -------------- Mar. 30, 1954